(12) United States Patent  (10) Patent No.: US 8,702,414 B1
Pitsch et al.  (45) Date of Patent: Apr. 22, 2014

(54) LIP ADJUSTMENT PUSH SYSTEM

(75) Inventors: Brian M. Pitsch, Jim Falls, WI (US);
Jesse J. Schemenauer, Chippewa Falls, WI (US)

(73) Assignee: Allied Dies, Inc., Chippewa Falls, WI (US)

( * ) Notice: Subject to any disclaimer, the term of this patent is extended or adjusted under 35 U.S.C. 154(b) by 208 days.

(21) Appl. No.: 13/112,790

(22) Filed: May 20, 2011

(51) Int. Cl.
B29C 47/16 (2006.01)

(52) U.S. Cl.
USPC .......................................................... 425/150

(58) Field of Classification Search
CPC .................................................... B29C 47/165
USPC .......................................................... 425/150
See application file for complete search history.

(56) References Cited

U.S. PATENT DOCUMENTS

| | | | |
|---|---|---|---|
| 5,679,383 A * | 10/1997 | Ryan et al. | 425/141 |
| 6,017,207 A | 1/2000 | Druschel | |
| 6,663,375 B1 | 12/2003 | Ulcej | |
| 2007/0290398 A1 | 12/2007 | Druschel et al. | |

OTHER PUBLICATIONS

Kurtus, Ron; "Resistive Force of Friction"; Aug. 20, 2008; accessed http://www.school-for-champions.com/science/friction.*
AutoGauge (Prior Art), cross-section of die body and AutoGauge mechanism, one page.

* cited by examiner

*Primary Examiner* — Yogendra Gupta
*Assistant Examiner* — Alison Hindenlang
(74) *Attorney, Agent, or Firm* — Anthony J. Bourget

(57) ABSTRACT

The invention comprises a die apparatus including a flexible lip for adjusting a gap between the flexible lip and a second lip. The apparatus includes linear moving members that are adjusted through operative communication with gradients on a slide bar. Ball bearings may be in operative communication with the gradients of the slide bar. Movement of the slide bar causes the ball bearings to move linearly, which, in turn, cause the linear moving members to move in a similar linear direction. The moving members operatively communicate with the lip. As a result, the dimensions of the gap may be changed by moving the slide bar in a first direction.

25 Claims, 4 Drawing Sheets

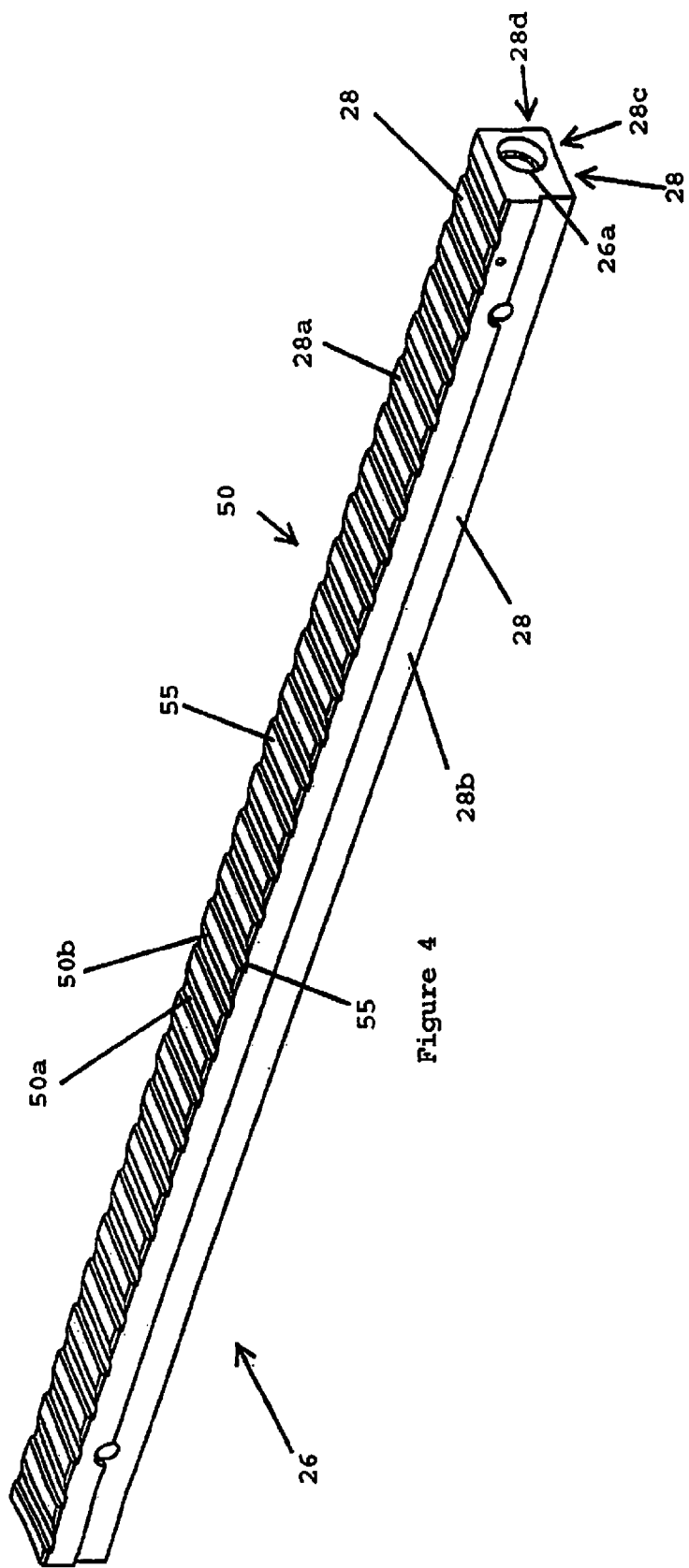
Figure 4
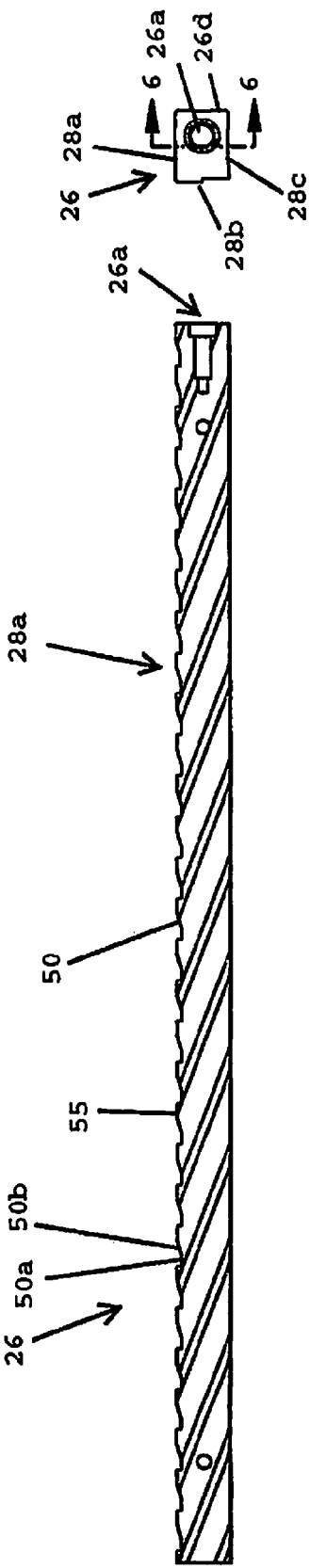
Figure 5
Figure 6

LIP ADJUSTMENT PUSH SYSTEM

BACKGROUND OF THE INVENTION

1. Field of the Invention

The present invention relates generally to dies for extruding materials, and more specifically to die adjustment devices for adjusting a gap or gaps between adjacent portions of die bodies.

2. Background Information

Flat sheet or film extrusion dies typically include a pair of die bodies that operate to form an outlet through which material is extruded. Each die body may typically include a lip, where the lips may at least partially form the outlet. Further, at least one of the lips may be a flexible lip that is capable of being adjusted to provide a particular sheet or film thickness of the material.

The flexible lips of the prior art extrusion dies may be adjusted and controlled by a controlling mechanism, as exemplarily described in U.S. Pat. No. 6,663,375 ("'375") to Ulcej and U.S. Pat. No. 6,017,207 ("'207") to Druschel. As shown in the '375 and '207 patents, a controlling mechanism may include links (or push/pull blocks in the case of the '207 patent), where the links (or blocks) directly push or pull on a portion of a flexible lip to cause movement of the flexible lip. Further, the links (or blocks) may be actuated by movement of an adjustment bar that slides along a main portion of the die body having the flexible lip.

While the prior art has provided examples of features of die lip adjusting mechanisms, there is always room for further improvement.

SUMMARY OF THE INVENTION

Although die adjusting mechanisms may be known for adjusting a gap between lips of adjacent die bodies, the inventors have realized improvements thereon. Applicants have realized that known adjusting devices fail to teach a die adjusting apparatus that provides single direction, quick, accurate and repeatable adjusting of the gap between lips of adjacent die bodies. Prior devices have also been deficient in maintaining a uniform gap that runs the width of the die, especially for dies that are relatively wide. Applicants have realized these deficiencies and have combined the below objectives in a novel manner to provide a die adjusting device that has been developed for the purpose of being able to swiftly and accurately adjust the spacing between adjacent lips of die bodies.

In accordance with an aspect of the invention, the device is directed toward a system usable with die apparatuses including two die bodies. The die bodies of a die apparatus may include a main body, a hinge and a lip. Further, the device and system may include linear moving members, ball bearings and a sliding member all in adjustable connection, or integrally formed, with a die body or the die bodies. At least one of the die bodies may include a flexible lip that moves toward and away from a paired lip of the second die body, where the movable lip moves about a hinge coupled to a main body.

In operation of the inventive system, the sliding member, within or upon the main body portion, may abut a plurality of ball bearings and the ball bearings may abut the linear moving members and the main body portions, or alternatively, the sliding member may directly abut the linear moving members. If included, the ball bearings may be a first set and a second set of ball bearings (or additional or fewer sets as desired). The second set of ball bearings may abut the sliding member and the first set of ball bearings. The first set of ball bearings may abut the second set of ball bearings along with an associated linear moving member. Each linear moving member may have a first end abutting the ball bearings (or the sliding member) and a second end abutting (or operatively communicating with) the lip of a die body. Linear moving members may also abut a main body of the die body. As a result of the connections, when the sliding member is adjusted, the ball bearings move linearly causing linear moving members to move linearly and, as the linear moving members move, the flexible lip is adjusted with respect to its paired lip.

An object of the inventive system is to provide an adjustment mechanism for accurately and repeatedly adjusting dimensions of a gap between lips of die bodies in an extrusion die.

An object of the inventive system is to provide a single-point adjustment system on a dual lip die, where the adjustment system is used to adjust the lip opening, and to do so quickly.

An object of the inventive system is to provide an adjustment system for extrusion processes in the sheeting industry to allow for a wide range of lip-gap dimensions.

It is a further object of the system to provide a separate cross-web gauge (i.e., lip gap) adjustment mechanism that is separate from the overall gap adjustment.

It is a further object of the invention to provide a system for controlling machine-direction orientation in the extruded sheets. It is often desired to adjust the lip opening to be as close to the finished web thickness as possible. This is accomplished by controlling the machine direction (MD) orientation. The relationship between the lip opening and the finished web thickness is called the draw ratio.

It is a further object of the invention to provide an expedient system allowing for precise and repeatable adjustment of the gap between lips of die bodies in an extrusion die.

It is a further object of the invention to provide a system that uses simple parts having low manufacturing costs and parts that are easily replaceable and where relatively minimal force is required to make the lip adjustment.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 4 is a perspective view of a feature of the invention.

FIG. 5 is an end view of the feature of FIG. 4.

FIG. 6 is a cross-section view of the feature of FIG. 4. taken along line 6-6 in FIG. 5.

Figure 1:
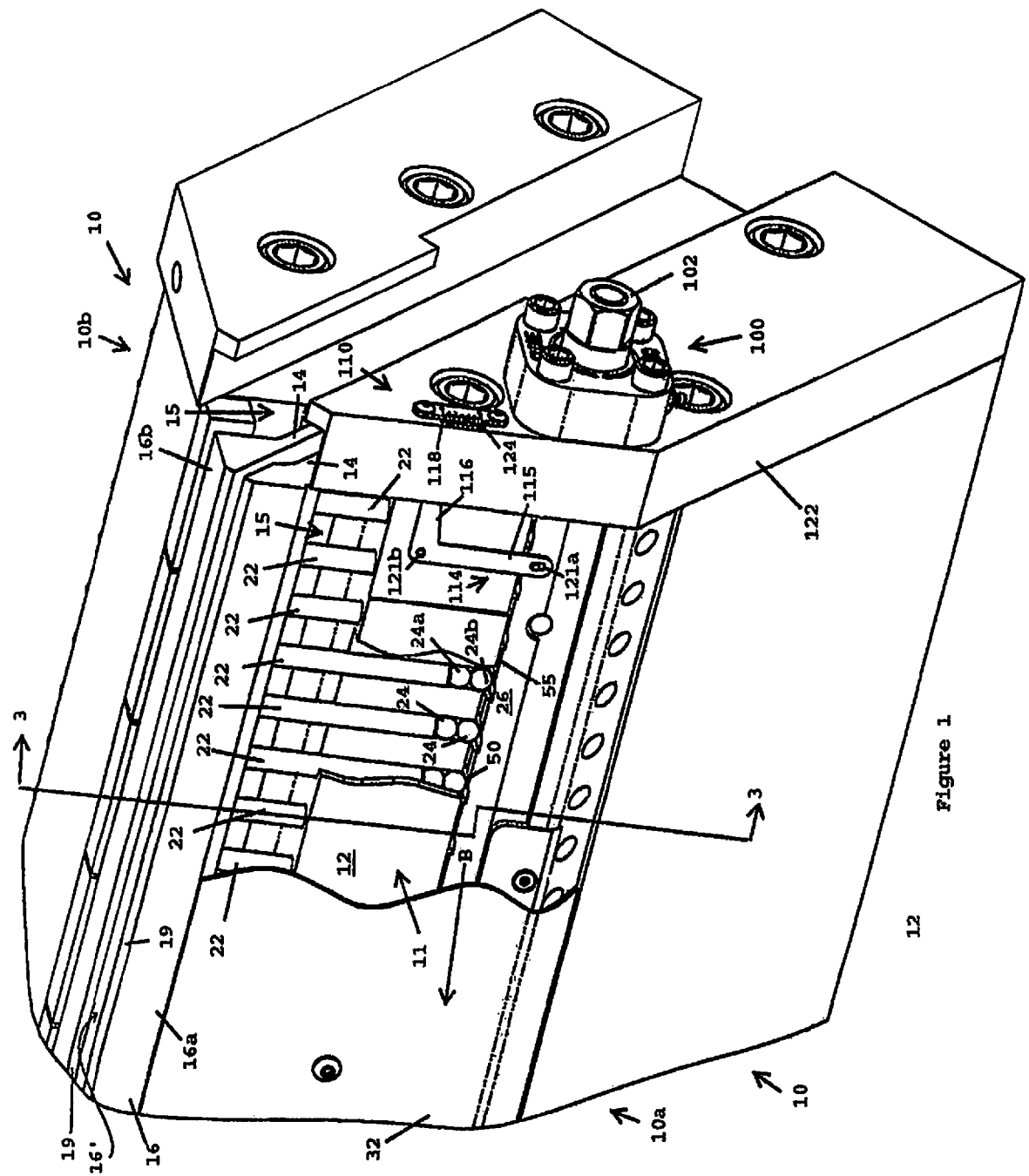
FIG. 1 is a partial perspective view of a feature of the invention.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

Referring now to FIGS. 1-6, the invention is directed to a lip adjustment system used in, or with, a die assembly having a lip gap 16' (depicted in FIG. 1 as gap 16' between first die body 10a and second die body 10b). When assembled, portions of the adjustment system may be kept from view by cover 32, as seen in FIG. 1, and may comprise die bodies 10, where at least one of die bodies 10 (e.g., one of a first die body 10a and a second die body 10b) may have a main body 12, a hinge 14 and a lip 16. Further, linear moving members 22, optional ball bearings 24, and a sliding member 26 may communicate with one another and the at least one of die bodies 10 to adjust lip gap 16'. The at least one of die bodies 10 (i.e., 10a in FIG. 1) may include a first flexible lip 16a that is capable of being spatially moved with respect to a second flexible lip 16b of the second die body 10b (e.g., lip 16a may be moved toward and away from a paired lip 16b). The above elements of the adjustment system may be connected in such a manner so as to be able to control movement of lip 16a about hinge 14 by a single-point adjustment control 100.

Figure 3:
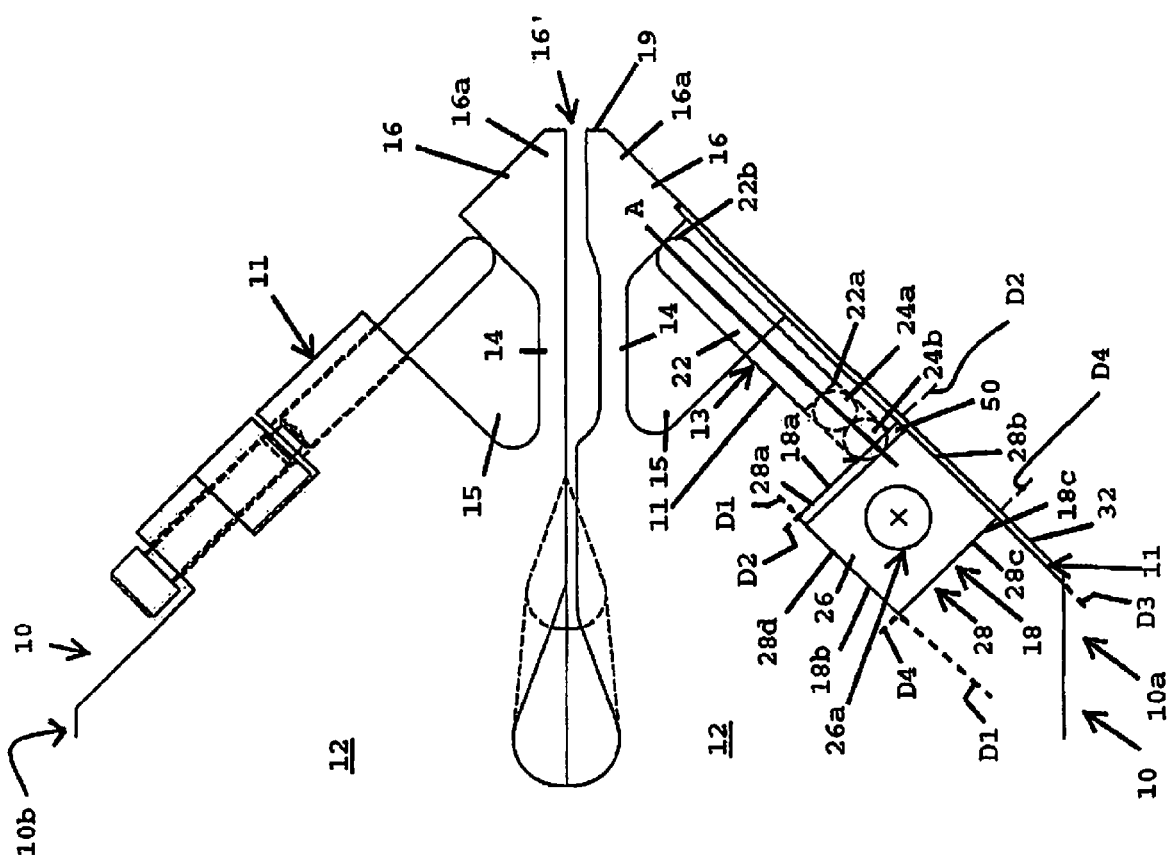
FIG. 3 is a partial cross-section of a feature of the invention taken along line 3-3 in FIG. 1 with the showing of a cover plate.

In construction of the system, die body 10a may receive sliding member 26 at any location; for example, sliding member 26 may be inserted into a slot 18 located on a top side 11 of, or other location on, die body 10, as seen for example in FIGS. 1 and 3. Sliding member 26 may engage slot 18 in any manner that allows sliding member 26 to slide along slot 18 in response to an action by single-point adjustment control 100. A nut 102 or other element of adjustment control 100 may be rotated clockwise or counter-clockwise to operate an opening gap 16'. Rotating nut 102 may cause sliding member 26 to slide within slot 18. Sliding member 26 may be in at least communication or operative communication with linear moving member 22 and lip 16 of first die body 10a, which may result in lip 16 being adjusted as sliding member 26 is adjusted.

Figure 2:
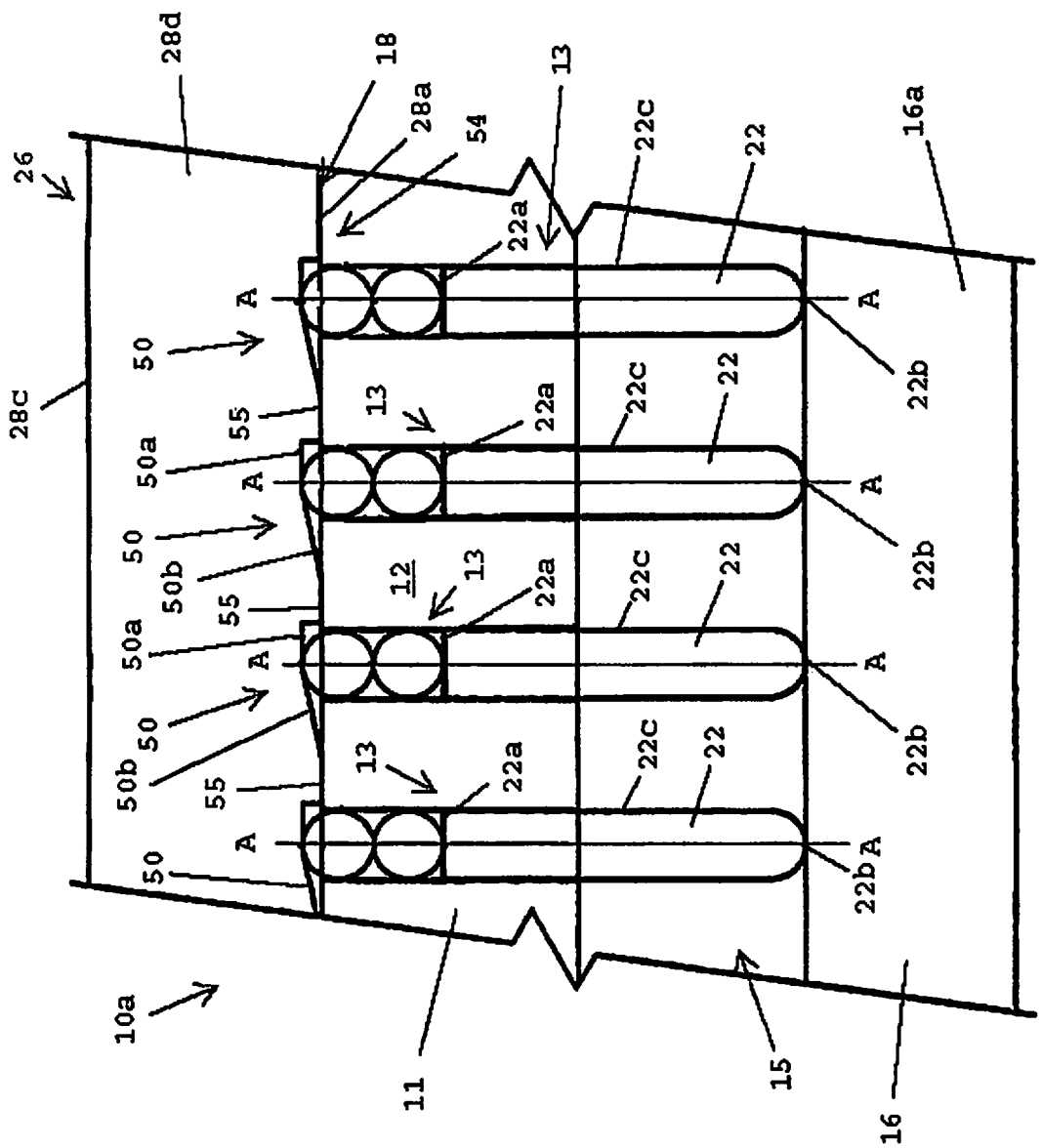
FIG. 2 is a partial rotated side view of a feature of the invention.

In addition to receiving sliding member 26, top side 11 of die body 10a or other location on die body 10a may receive linear moving member(s) 22, as seen for example in FIGS. 1-3. Linear moving members 22 may engage top side 11 of main body 12 in any manner as long as it maintains a sliding engagement with top side 11. For example, linear moving members 22 may be inserted into a channel 13 at least partially defined within top side 11 and secured within channel 13. Channel 13 is at least partially defined by body 12. In one aspect channel 13 and/or moving members 22 may be covered by cover 32 as shown in FIG. 1. Alternatively or in addition, linear moving members 22 may be completely enclosed within main body 12 as seen in FIGS. 1 and 3. Further, linear moving members 22 may extend across space 15 from main body 12 to lip 16a, as shown in FIGS. 1-3, where linear moving member(s) 22 abut lip 16a. Main body 12 may receive ball bearings 24 in a manner that allows ball bearings 24 to communicate with sliding member 26 and linear moving members 22.

Die body 10a of the adjustment system includes main body 12 with hinge 14 extending from main body 12 to flexible lip 16a. Lip 16a may be separated from main body 12 by hinge 14 and space 15, as seen in FIGS. 1 and 2. When lip 16 is adjusted by the adjustment system, it may move about hinge 14.

Sliding member 26 of the adjustment system may be any material, shape and size capable of sliding within or on slot 18 in main body 12 and effecting movement of (i.e., operatively communicating with) moving members 22; for example, as seen in FIGS. 1-6, sliding member 26 may be an elongated material having a single-point adjustment receiving hole 26a therein. Hole 26a may extend at least partially through sliding member 26. Sliding member 26 may have any number of sides 28 or just one side (e.g., a circular cross-section); for example, sliding member 26 may have a first side 28a, a second side 28b, a third side 28c and a fourth side 28d. Each side 28 may have any length and height; however, it may be preferable for opposite sides to have substantially identical lengths and heights. Further, as seen with reference to FIG. 1 and FIG. 4, when sliding member 26 is engaged in first die body 10a, first side 28a may be a side 28 of sliding member 26 that does not abut cover 32, such that cover 32 is parallel to and is directly adjacent to, or abuts, top side 11 and second side 28b. That is, first side 28a may be a side 28 of sliding member 26 most proximal lip 16.

First side 28a may have a gradient 50 (or a plurality of gradients 50), where gradient 50 extends along the whole side and is generally repeated, forming a saw-tooth type of pattern. As shown, in one aspect gradients 50 are defined by sliding member 26 (and while other arrangements are possible, gradients 50 are preferably machined into the sliding member 26 and/or integral to sliding member 26). First side 28a may have a grade portion (or gradient 50) and a uniform portion (i.e. a space 55 region that separates adjacent gradients 5). In one aspect, a grade portion may include a gradient or gradients (e.g., gradient 50) recessed with respect to uniform portion 55 (See FIG. 2). Gradients 50 may abut one another or may be spaced apart from one another (i.e., have a space 55 between sequential gradients 50) along a length of sliding member 26, as shown in FIGS. 1-6. Further, gradient portion and uniform portion may be located at various locations along first side 28a. For example, first side 28a may include a gradient portion between two uniform portions. In a resting position (as shown in FIG. 1) where the sliding member 26 is not being moved, linear moving member 22 (or optional ball bearing 24) is positioned to abut uniform portion 50a (See FIG. 2). Where sliding member 26 is moved (i.e., in the direction of arrow A), linear moving member 22 (or optional ball bearing 24) is positioned to abut grade portion 50b. It may be appreciated that grade portion 50b is inclined (or may be declined) with respect to uniform portion 50a (or with respect to space 55).

Slot 18 may be any shape and size capable of receiving sliding member 26. For example, slot 18 adjacent slot or channel 13 may have a first side 18a spanning a first distance between dotted lines D1 and D3, a second side 18b spanning a second distance between dotted lines D2 and D4, and a third side 18c spanning a third distance between dotted lines D1 and D3, where all sides 18a-c at least partially abut respective sides 28a, 28d, and 28c of sliding member 26. In the example, first side 18a and third side 18c may be substantially parallel.

Linear moving member(s) 22 of the adjustment system may be any material, shape and size; for example, as seen in FIGS. 1-3, linear moving member 22 may be an elongated piece having a substantially flat first end 22a and a substantially rounded second end 22b. First end 22a and second end 22b may be terminal ends as shown in FIG. 1 and may be separated by an elongated portion 22c. Elongated portion 22c may take on any shape and size; for example, elongated portion 22c may be rounded or multi-sided. First end 22a may abut ball bearings 24 or may directly contact gradient 50 of sliding member 26 and second end 22b may be in communication (operative or otherwise) with lip 16 (e.g., to indirectly or directly contact or abut lip 16). Linear moving members 22 may further abut top side 11 in a sliding manner and may be located within channel 13 in main body 12 (e.g., as shown in FIGS. 2 and 3) or may be at least partially enclosed within main body 12 (e.g., as shown in FIG. 1).

As seen in FIGS. 1-3, member 22 may extend from sliding member 26 or ball bearings 24 to and through or over space 15, where space 15 is defined in part by main body 12, hinge 14 and lip 16a. As further shown, member 22 may extend from main body 12, across space 15 and may communicate with (e.g., make indirect or direct contact with) lip 16a. Member 22 may contact or communicate with lip 16 from a position within space 15, seen in FIG. 1, or at another location. Such contact and arrangement may allow linear moving members 22 to move linearly when such movement has been activated through single-point adjustment device 100 or another mechanism.

Linear moving members 22 may be one acceptable type of a variety of types of moving members. It may be appreciated that moving members are preferably a linear moving member such as linear moving member 22, yet in some aspects a moving member may be some other type of member that moves (whether or not linearly or exclusively linearly) or that is capable of placing a force on lip 16a.

Ball bearing(s) 24 may be any material, shape and size; for example, as seen in FIGS. 1-3, ball bearing member 24 may have a circular cross-section. Ball bearings 24 may be placed within channel 13 or other opening in main body 12 and may operatively contact linear moving member(s) 22 and gradients 50 of sliding member 26. In an exemplary embodiment, ball bearings 24 and linear moving member(s) 22 may align along a central longitudinal axis A-A thereof, as shown in FIGS. 2 and 3. Ball bearing(s) 24 may slidingly and rotatingly abut top side 11 of die body 10a or an interior thereof. For example, in each channel 13 a ball bearing of a second set of ball bearing(s) 24b may operatively contact sliding member 26 and top side 11 in any manner that allows ball bearing(s) 24 to rotate or move freely about top side 11 of first die body 10a. That is, a ball bearing of second set 24b communicates (operatively or otherwise) with (e.g., indirectly or directly contacts) sliding member 26 at or near an associated gradient 50 and communicates (operatively or otherwise) with (e.g. e.g., indirectly or directly contacts) a ball bearing of first set of ball bearings 24a. As mentioned, ball bearing(s) 24 may contact linear moving member(s) 22 and such operative contact, as seen in FIGS. 1-3, may include a ball bearing of first set 24a contacting first end 22a of linear moving member(s) 22. Although the examples in the figures show a first set of ball bearings 24a and a second set of ball bearings 24b, any number of, or sets of, ball bearings 24 may be utilized in each channel 13 and in the adjustment system.

The adjustment system may include numerous other features such as the single point adjustment control system 100 and gap measurement system 110. As seen in FIG. 1, gap measurement system 110 may comprise an indicator member 114 having an indicator body 115 and an indicator arm 116. Indicator member 114 may connect to sliding member 26 at a first end through an elongated hole 121a of indicator member 114 and may connect to main body 12a at a second end through hole 121b. Indicator arm 116 may extend through indicator opening 124 in end plate 122, or around end plate 122, to indicia 112. An indicator point 118 at a terminal end of indicator arm 116 may align with measuring indicia 112 to indicate a particular measurement of adjustment of lip gap 16'. In practice, when sliding member 26 is adjusted, indicator member 114 pivots about its connections and indicator point moves along measuring indicia 112 to indicate an amount of lip gap adjustment.

In operation of one aspect of the adjustment system, as sliding member 26 is adjusted within or upon the main body 12, sliding member 26 may act on a plurality of ball bearings 24 by linearly adjusting ball bearings 24 about a respective gradient 50 of sliding member 26. That is, when sliding member 26 moves in a first direction, gradient(s) 50 act(s) on ball bearing(s) 24 and move(s) ball bearing(s) 24 linearly into or against moving member(s) 22. Alternatively or in addition, sliding member 26 may act directly on linear moving members 22. As a result of the adjustment of sliding member 26 or the movement of ball bearings 24 or both, a plurality of linear moving members 22 move linearly and substantially transverse to the movement of sliding member 26 (although, the system may operate with any angle between movements of the linear moving members 22 and sliding member 26). As linear moving members 22 move, linear moving members 22 act on lip 16a. As a result of the forces exerted on lip 16a from linear moving members 22, lip 16a may move about hinge 14. As lip 16a moves and is adjusted, dimensions of a gap or space 16' between lips 16 of die bodies 10a, 10b are adjusted. Such a process of adjusting the position of flexible lip 16 may result in efficient and repeatable adjustment of lip 16.

It may be appreciated that lip 16 may be adjusted in an alternative manner, and may use some type of groove which allows linear moving members 22 to to push against a crossbar (or alternatively, there may be no groove at all). For instance, a cross-bar may be situated against, or abut, a lip tab or may be positioned in a cradle or other indentation formed in lip 16. Positioning a cross-bar linearly and close to lip edge 19 provides for a greater leverage to be imparted on lip 16 which results in a greater flex action (or less force may be used in order to have a desired flexing of lip 16 due to the mechanical advantage of positioning a cross-bar close to lip edge 19). Further, there may be an efficiency in having linear moving members 22 move only linearly, and combining such linear action of members 22 with the mechanical advantage and positioning of the cross-bar allows for ease and efficiency in applying the directed forces (i.e., less force is required to be imparted, for instance, at single point adjustment control 100) and a great range of flex of lip 16 can be achieved.

The lip adjustment system provides a repeatable gap adjustment, and presents little, if any, lag from one end of the lip to the other end (i.e., the gap as measured proximal the adjustment control 100 via a gap measurement system 110 is the same as, or acceptably the same as, the gap as measured distal the adjustment control 100). The die industry places great emphasis on exact and accurate machining of components so that a die may operate efficiently. Applicants appreciate that the present system and components, as compared to other designs, accommodate increased uniformity and consistency of produced components. The individual components align with each other for surface area effeciency (and optimal leverage) that results in the ability to move the components, and the lip, with minimal force. Applicants believe that the above efficiencies and accurate adjustments exist in die products having great widths, including dies having lip widths of over 100 inches.

Some common or traditional dies that have a moveable lip using a conventional lip bolt system (i.e., one that does not have a single-point adjustment mechanism) may have a flex range of, for instance, 0.040 inches, 0.075 inches or 0.100 inches. This is accomplished by moving a single lip. In some instances an extended range die may be built where the single lip (using conventional lip bolt system) has a range of 0.100 inches. A dual lip extends the range of that lip opening. The second lip preferably has a single point adjustment which pushes the lip closed, for a total of 0.100 inches. Such range might be accomplished by using two lips of the conventional lip bolt system, yet the time required to adjust the lip makes it impractical such that the die would be rarely made and rarely used. Applicants have found that using a single-point adjustment lip of under the present system, and having a range of 0.100 inches, when paired with another lip having a range of 0.100 inches, allows for a total stroke amount of 0.200 inches (the single-point push only lip moves a total of 0.100 inches; while the conventional lip may move 0.100 inches). In some instances under the present system the total stroke is approximately 0.275 inches, and can be made as a single-point adjustment.

The lip adjustment system may be used in general extrusion production and in order to vary the total stroke or the range of the gap.

Numerous terms have been used throughout this description to describe features of the invention. These terms may generally be given their commonly understood meaning. For example, "direct contact" means that objects or features are physically touching and "elongated" is commonly known to mean a feature having a first dimension longer or greater than a second, transverse dimension.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular LIP ADJUSTMENT PUSH SYSTEM as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An extrusion die apparatus comprising:
a die body having a lip;
a linear moving member in operative communication with said lip;
a ball bearing in operative communication with said linear moving member; and
a sliding member having a gradient in operative communication with said ball bearing.

2. The apparatus of claim 1, further comprising:
where said ball bearing moves linearly in response to movement of said sliding member.

3. The apparatus of claim 1 where said sliding member moves in a direction transverse to a linear direction of movement of said ball bearing.

4. The apparatus of claim 1 where said gradient is defined by said sliding member at a position of said sliding member closest to said flexible lip.

5. A die apparatus comprising:
a die body having a flexible lip;
a plurality of moving members, each of said plurality of moving members having a first end and a second end;
a sliding member having gradients in operative communication with said first ends of said plurality of moving members, at least one of said gradients defined by said sliding member at a position of said sliding member closest to said flexible lip;
said second ends are in operative communication with said flexible lip, and
where said flexible lip is moved in response to movement of said sliding member.

6. The apparatus of claim 5, further comprising:
said first ends are terminal ends of said plurality of moving members; and
said second ends are terminal ends of said plurality of moving members.

7. The apparatus of claim 6, further comprising:
at least one of said first ends abuts one of said gradients.

8. The apparatus of claim 5, further comprising:
at least one of said plurality of moving members directly contacts said sliding bar.

9. The apparatus of claim 5, further comprising:
a space between sequential gradients along a length of said sliding member.

10. The apparatus of claim 5, further comprising:
an elongated slot at least partially defined by said die body;
said sliding member extending at least partially within said elongated slot.

11. The apparatus of claim 10, further comprising
said elongated slot comprises a first side, a second side and a third side, and
where said first side of said elongated slot is substantially parallel to said third side.

12. The apparatus of claim 5, further comprising:
at least one ball bearing in operative communication with one of said gradients and with one of said plurality of moving members.

13. The apparatus of claim 12, further comprising:
said at least one ball bearing directly contacting said first end of one of said plurality of moving members.

14. The apparatus of claim 12, further comprising:
a plurality of ball bearings in operative communication with gradients adjacent said one of said gradients and respective adjacent said first ends of said plurality of said moving members.

15. The apparatus of claim 12, further comprising:
where said at least one ball bearing moves along an axis of one of said plurality of moving members.

16. The apparatus of claim 15, further comprising:
each of said plurality of ball bearings move linearly along an axis of a respective adjacent said plurality of moving members, and
where each of said respective adjacent said plurality of moving members moves linearly along its respective axis.

17. The apparatus of claim 5, further comprising:
a plurality of ball bearings comprising a first set of ball bearings in operative communication with respective said moving members and a second set of ball bearings in operative communication with respective said gradients, and where a ball bearing of said first set of ball bearings communicates with a ball bearing of said second set of ball bearings.

18. The apparatus of claim 17, further comprising:
said ball bearing of said first set of ball bearings abuts said first end of a respective said moving member and abuts said ball bearing of said second set of ball bearings.

19. The apparatus of claim 5, further comprising:
a plurality of ball bearings comprising a first set of ball bearings and a second set of ball bearings;
said second set of ball bearings operatively communicate with said sliding member; and
said second set of ball bearings operatively communicate with said first set of ball bearings.

20. The apparatus of claim 19, further comprising:
said sliding member abuts said second set of ball bearings;
said first set of ball bearings abut said second set of ball bearings; and
said moving members abuts said first set of ball bearings.

21. An extrusion die apparatus comprising:
a first die body and a second die body, said first die body comprising:
a main body;
a plurality of linear moving members abutting said main body;
a plurality of ball bearings operatively communicating with respective said linear moving members, and
a sliding member slidingly abutting said main body of said first die body;
said plurality of ball bearings operatively communicate with said sliding member, and
where said plurality of ball bearings move linearly in response to transverse movement of said sliding member.

22. An extrusion die, comprising:
a first die body portion having a lip moveable about a hinge portion extending from a main body of said first die portion;
a second die body portion having a lip;
said first die body portion engaging a ball bearing communicating with a linear moving member;
said linear moving member operatively communicating with said lip of said first die body portion where said lip of said first die body portion moves in response to movement of said linear moving member, and
a sliding member communicating with said ball bearing
where sliding of said sliding member operatively moves said lip along a path generally transverse the movement of said sliding member.

23. The extrusion die of claim 22, further comprising:
a gradient along said sliding member, and
where said gradient abuts said ball bearing.

24. The extrusion die of claim 23 where said sliding member includes a plurality of gradients.

25. The extrusion die of claim 24 where all gradients of said plurality of gradients are identical.

* * * * *